United States Patent
Lin et al.

(10) Patent No.: US 9,276,481 B2
(45) Date of Patent: Mar. 1, 2016

(54) POWER CONTROL DEVICE FOR DYNAMICALLY ADJUSTING FREQUENCY

(71) Applicant: INNO-TECH CO., LTD., Taipei (TW)

(72) Inventors: Ching-Yuan Lin, Taipei (TW); Shu-Chia Lin, Taipei (TW); Chih Feng Lin, Taipei (TW)

(73) Assignee: INNO-TECH CO., LTD., Taipei (TW)

( * ) Notice: Subject to any disclaimer, the term of this patent is extended or adjusted under 35 U.S.C. 154(b) by 224 days.

(21) Appl. No.: 14/029,796

(22) Filed: Sep. 18, 2013

(65) Prior Publication Data

US 2015/0078037 A1    Mar. 19, 2015

(51) Int. Cl.
- *H02M 3/335* (2006.01)
- *H02M 7/02* (2006.01)
- *H02M 7/04* (2006.01)
- *H02M 1/00* (2007.01)

(52) U.S. Cl.
CPC ...... *H02M 3/33523* (2013.01); *H02M 3/33507* (2013.01); *H02M 7/02* (2013.01); *H02M 7/043* (2013.01); *H02M 2001/0009* (2013.01); *H02M 2001/0054* (2013.01)

(58) Field of Classification Search
CPC .................................................. H02M 3/33523
See application file for complete search history.

(56) References Cited

U.S. PATENT DOCUMENTS

| | | | |
|---|---|---|---|
| 2007/0103134 A1* | 5/2007 | Yang et al. | 323/282 |
| 2010/0302815 A1* | 12/2010 | Li et al. | 363/21.09 |
| 2011/0019446 A1* | 1/2011 | Wu et al. | 363/79 |
| 2011/0110123 A1* | 5/2011 | Li et al. | 363/21.17 |
| 2011/0204866 A1* | 8/2011 | Moon et al. | 323/284 |
| 2012/0008346 A1* | 1/2012 | Kawamura | 363/21.15 |
| 2012/0044724 A1* | 2/2012 | Morota et al. | 363/21.17 |
| 2012/0106208 A1* | 5/2012 | Sugawara | 363/21.13 |
| 2012/0134705 A1* | 5/2012 | Fukutani | 399/88 |
| 2013/0236203 A1* | 9/2013 | Nakajima et al. | 399/88 |

* cited by examiner

*Primary Examiner* — Timothy J Dole
*Assistant Examiner* — Bryan R Perez
(74) *Attorney, Agent, or Firm* — Lin & Associates Intellectual Property, Inc.

(57) ABSTRACT

A power control device for dynamically adjusting frequency includes an electric transformer, a controller, a loading feedback unit, and a switching transistor. The electric transformer includes a first side induction coil connected to an input power unit, a second side induction coil connected to a loading unit to generate an output power by electromagnetic induction with the first side induction coil, and an auxiliary induction coil generating a power sensing signal by electromagnetic induction with the first side induction coil. The loading feedback unit generates a loading feedback signal. The controller determines the level of loading based on the loading feedback signal and further detects the valleys of the power sensing signal so as to change the switching signal which controls the switching transistor at the optimal one of the valleys.

4 Claims, 5 Drawing Sheets

POWER CONTROL DEVICE FOR DYNAMICALLY ADJUSTING FREQUENCY

BACKGROUND OF THE INVENTION

1. Field of the Invention

The present invention generally relates to a power control device, and more specifically to a power control device for dynamically adjusting the frequency by using a feedback loading signal to determine the level of loading and detect the optimal valley of the power sensing signal so as to change the switching signal which controls the switching transistor based on the optimal valley.

2. The Prior Arts

For many of various electronic devices, the requirements of electric power are quite different, such as direct current (DC) or alternating current (AC) power, different voltage level, current, and electric power. As a result, the power supply manufacturers have been developing many kinds of power conversion device to meet respective needs. For instance, electric motors generally need 12V DC to drive such that the power conversion device has to convert 110V AC city power or lower level electric power provided by the battery into 12V DC power. Many ICs (integrated circuits) are generally designed for 5V, 3V or 1.8V, so city power has to be converted into suitable lower level power. For some application field of high power devices fed with higher level power, such as the inverter supplying higher AC power to turn on the lamps, the power conversion devices have to convert 12V DC power from the battery into 110V or much higher voltage AC power.

In the prior arts, the switching power converter is one of the common used power conversion devices because of the advantages like simple architecture, low cost and broader adjustable range. Especially, the scheme of zero voltage switching and/or zero current switching is used to fulfill the object of reducing the switching loss caused by the switching elements (generally the power transistors) so as to improve the efficiency of power conversion.

Specifically, the switching power converters primarily generate the PWM (pulse-width modulation) signal served as the driving signal to drive the switching transistor, which controls the current to flow through the induction coil wound around the electric transformer, such that the voltage and/or current of the output power is changed. Owing to the inductance effect resulted from the induction coil and the parasitic capacitance effect from peripheral capacitors, electronic elements or loading, the switching transistor may suffer from damping resonance or bouncing after a period of time when turned off. Additionally, to reduce the switching loss, it often needs to switch the switching transistor at some specific valley in the bouncing process. The scheme is also called "valley switching", which turns on the switching transistor at the specific valley. The operation of valley switching is usually performed at a fixed valley number. That is, the switching transistor is always turned on at the default fixed valley number.

However, one shortcoming of the valley switching with the fixed valley number in the prior arts is that the frequency of the switching signal becomes higher as the loading is lighter, and the frequency is lower as the loading is heavier. Thus, it greatly deteriorates the efficiency of power conversion without dynamically adjusting the frequency of the switching signal according to the actual level of loading.

Therefore, it is greatly needed to provide a power control device for dynamically adjusting frequency, which utilizes a specific control criterion to determine the valley number for the switching signal to change such that the frequency of the switching signal becomes lower when the loading is lighter, the switching loss is greatly reduced, and the efficiency of power conversion is improved, thereby overcoming the above problems in the prior arts.

SUMMARY OF THE INVENTION

The primary object of the present invention is to provide a power control device for dynamically adjusting frequency. The power control device is electrically connected to an input power unit and a loading unit to transform an input power into an output power used to supply the loading unit. The power control device of the present invention generally comprises an electric transformer, a controller, a loading feedback unit, and a switching transistor. The electric transformer comprises a first side induction coil connected to the input power unit, a second side induction coil connected to the loading unit to generate the output power by electromagnetic induction with the first side induction coil, and an auxiliary induction coil generating a power sensing signal by electromagnetic induction with the first side induction coil. The loading feedback unit is connected to the second side induction coil and the loading unit so as to generate a loading feedback signal corresponding to the output power. The controller receives the power sensing signal and the loading feedback signal to generate a switching signal based on a specific control criterion. The switching transistor connected to the controller and the first side induction coil receives the switching signal to control the conducting current of the first side induction coil, thereby implementing the function of power conversion.

The above-mentioned control criterion is primarily used to control the switching frequency of the switching transistor. Specifically, the control criterion comprises the steps of determining a level of loading based on the loading feedback signal, detecting valleys of the power sensing signal, and selecting an optimal valley number based on the level of loading so as to change the switching signal. More particularly, when the loading is lighter, the valley number is increased to reduce the frequency of the switching signal, wherein the conducting period of the switching transistor or the high level period of the switching signal is controlled by the loading feedback signal.

Therefore, the present invention can dynamically adjust the frequency of the switching signal based on the loading level such that the frequency is adjusted lower when the loading becomes lighter, and similarly, the frequency increases when the loading is heavier. As a result, the switching loss is greatly reduced, and the whole efficiency of power conversion is thus improved.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

The present invention may be embodied in various forms and the details of the preferred embodiments of the present invention will be described in the subsequent content with reference to the accompanying drawings. The drawings (not to scale) show and depict only the preferred embodiments of the invention and shall not be considered as limitations to the scope of the present invention. Modifications of the shape of the present invention shall too be considered to be within the spirit of the present invention.

Figure 1:
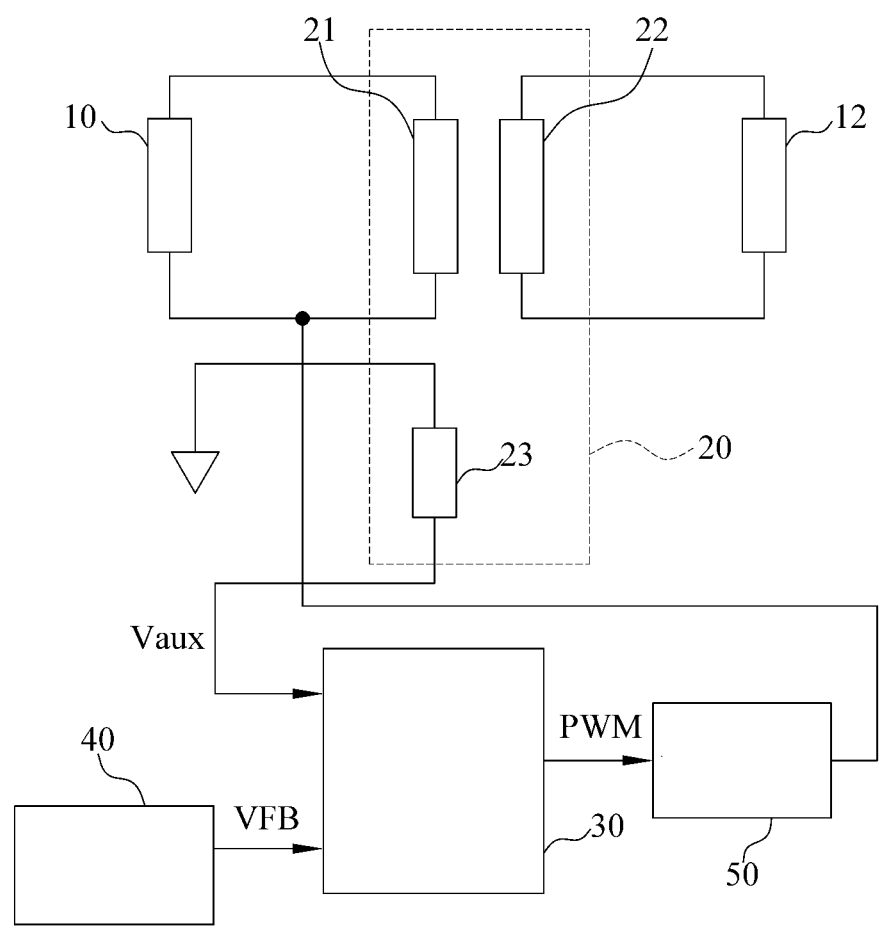
FIG. 1 is a view illustrating the power control device for dynamically adjusting frequency according to the one embodiment of the present invention.

Please refer to FIG. 1. The power control device for dynamically adjusting frequency according to one embodiment of the present invention is electrically connected to an input power unit 10 and a loading unit 12. Specifically, the power control device of the present invention generally comprises an electric transformer 20, a controller 30, a loading feedback unit 40, and a switching transistor 50 in order to transform an input power provided by the input power unit 10 into an output power used to supply the loading unit 12. The output power has a voltage and/or a current different from that of the input power.

The controller 30 is preferably implemented by a microcontroller unit (MCU).

The electric transformer 20 of the present invention comprises a first side induction coil 21, a second side induction coil 22 and an auxiliary induction coil 23, which are wound around the respective iron cores (not shown) to increase electric effect. The first side induction coil 21 of the electric transformer 20 is connected to the input power unit 10, the second side induction coil 22 is connected to the loading unit 12 to generate the output power by electromagnetic induction with the first side induction coil 21, and the auxiliary induction coil 23 generates a power sensing signal Vaux by electromagnetic induction with the first side induction coil 21.

The loading feedback unit 40 is connected to the second side induction coil 22 and the loading unit 12 so as to generate a loading feedback signal VFB corresponding to the output power.

The controller 30 receives the power sensing signal Vaux and the loading feedback signal VFB to generate a switching signal PWM based on a control criterion. The switching transistor 50 connected to the controller 30 and the first side induction coil 21 receives the switching signal PWM to control the conducting current of the first side induction coil 21, thereby controlling the current and/or voltage of the second induction coil 22 to implement the function of power conversion.

Figure 2:
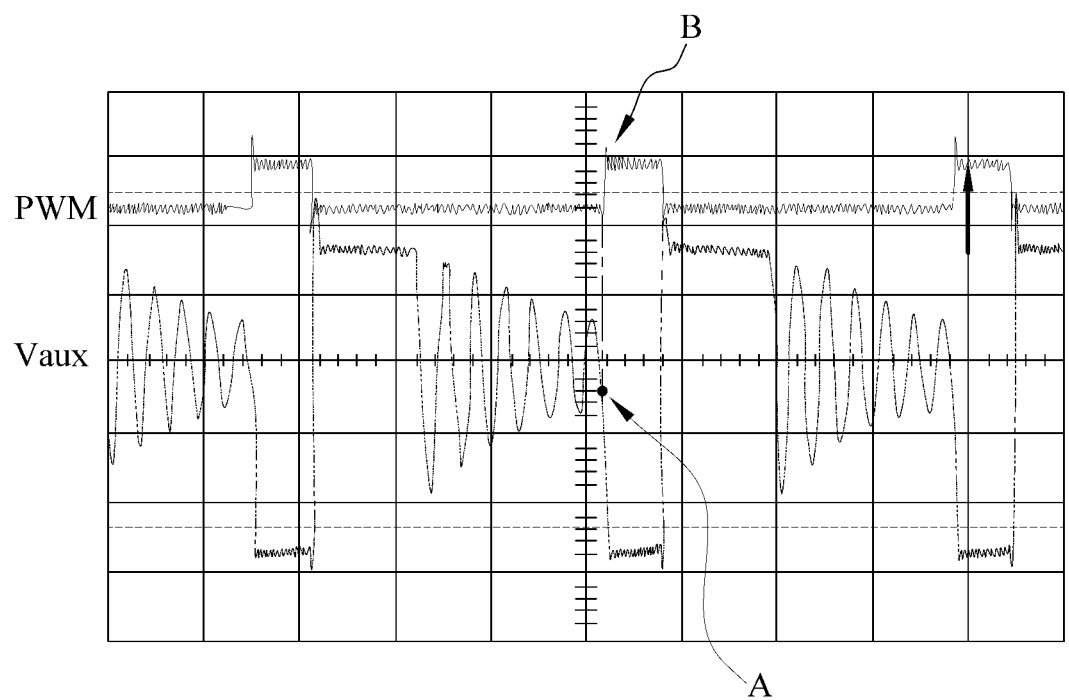
FIG. 2 is a waveform diagram showing the operation of the power control device according to the present invention.

The above control criterion is primarily used to control the switching frequency of the switching signal PWM. Refer to FIG. 2 showing an operation waveform diagram for the power control device according to the present invention. When the switching transistor 50 turns off the conducting path of the first induction coil 21 based on the switching signal PWM like low level, the induced current of the first induction coil 21 decreases to zero, and the voltage of the first induction coil 21 tends to bounce for a while such that the power sensing signal Vaux is caused to simultaneously bounce. The locally lowest level of the power sensing signal Vaux is called "valley" and the locally highest level is referred to "peak". Generally, the power sensing signal Vaux gradually settles down after several valleys in the bouncing process. When the power sensing signal Vaux is at the valley, the switching loss is relatively lowest if the switching signal PWM is switched to high level from previous low level to turn on the conducting path of the first induction coil 21. Thus, the primary object of the control criterion is to change the level of the switching signal PWM when the power sensing signal Vaux is at the optimal one of the valleys.

To fulfill the above object, the control criterion specifically comprises the following steps. First, the level of loading is determined according to the loading feedback signal VFB. The valleys of the power sensing signal Vaux are then detected. Finally, the optimal valley number is selected according to the loading level to change the switching signal PWM so as to control or turn on the switching transistor 50. Preferably, the optimal valley number is increased to decrease the frequency of the switching signal PWM when the loading level becomes lighter. In other words, the lighter the loading level, the later the switching signal PWM changes. The conducting period of the switching transistor 50 or the period of the switching signal PWM at high level is controlled by the loading feedback signal VFB.

To detect the valleys of the auxiliary signal Vaux, it is preferred to continuously compare two successive auxiliary signals Vaux at a fixed period so as to determine the time when the auxiliary signal Vaux is the locally lowest. Furthermore, it is possible to predict the next valley from the present valley because the auxiliary signal Vaux usually bounces at some fixed LC resonance frequency.

Figure 3:
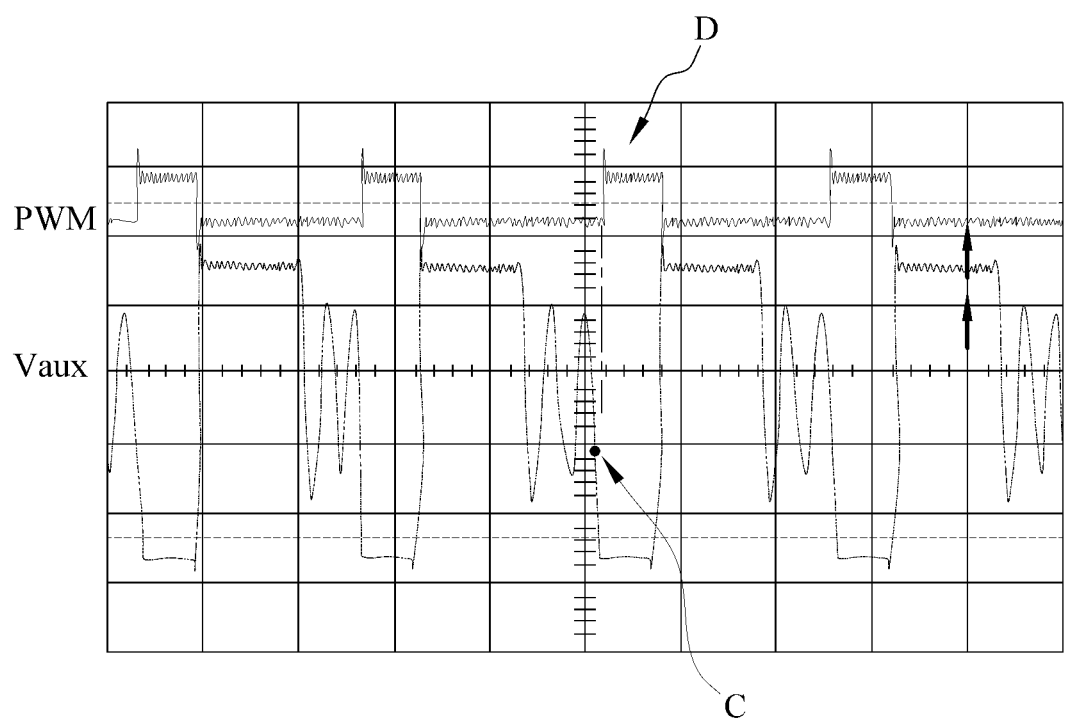
FIG. 3 is a waveform diagram showing another operation of the power control device according to the present invention.

To further describe the primary aspects of the present invention, please refer to both FIGS. 2 and 3 illustrating two different operation waveforms for the power control device of the present invention, each with the switching signal PWM at high level for a fixed period. As shown in FIG. 2, the switching signal PWM changes to high level at the preset seventh valley of the power sensing signal Vaux, and the arrows A and B indicate the seventh valley and the corresponding turning point of the switching signal PWM, respectively. Similarly, FIG. 3 shows another case that the switching signal PWM is preset to change to high level at the third valley of the power sensing signal Vaux, and the arrows C and D indicate the third valley and the corresponding turning point of the switching signal PWM, respectively.

From FIGS. 2 and 3, it is obvious that the switching signal PWM in FIG. 2 has lower frequency than that of the switching signal PWM in FIG. 3 because the valley number for the switching signal PWM to change in FIG. 2 is larger than that in FIG. 3. That is, the low level period of the switching signal PWM in FIG. 2 is longer such that the period of the switching signal PWM in FIG. 2 is larger and the corresponding frequency is lower.

Hereafter is an example of selecting the optimal valley with more detailed description.

First, four comparison value, that is, the first, second, third and fourth comparison values CMP_H, CMP_M, CMP_ML and CMP_L, are used to determine the level of loading indicated by the loading feedback signal VFB. Specifically, the first comparison value CMP_H is greater than the second comparison value CMP_M, the second comparison value CMP_M is greater than the third comparison value CMP_ML, and the third comparison value CMP_ML is greater than the fourth comparison value CMP_L.

If the loading feedback signal VFB is greater than or equal to the first comparison value COMP_H, it is indicated that the loading is heavy and the valley number is thus set to zero, the allowable minimum value. In other words, the power control device of the present invention operates at the CCM (Continuous Conduction Mode).

If the loading feedback signal VFB is smaller than the first comparison value COMP_H and greater than the second comparison value CMP_M, the valley number is set to at least one, such as three, depending on the actual requirement. That is, the power control device of the present invention operates at the DCM (Discontinuous Conduction Mode). Therefore, the voltage level of the switching signal PWM changes to the high level from the low level at the third valley of the power sensing signal Vaux so as to perform the DCM. After that, if the loading feedback signal VFB is still greater than the second comparison value CMP_M and smaller than the first comparison value COMP_H, the valley number is set by decreasing the previous valley number by one to adjust the switching signal PWM, until the valley number is one, the minimum value for the DCM.

If the loading feedback signal VFB is smaller than the second comparison value CMP_M and greater than the third comparison value COMP_ML, the valley number is unchanged. If the loading feedback signal VFB is smaller than third comparison value COMP_ML and greater than the fourth comparison value COMP_L, the valley number is set by increasing the previous valley number by one, until the valley number reaches a preset allowable maximum value, like 20.

If the loading feedback signal VFB is smaller than the fourth comparison value COMP_L, that is, the loading level is very light, then the valley number is set to the maximum value such that the power control device of the present invention enters a burst mode.

Therefore, the switching signal PWM provided by the present invention has lower frequency in case of lighter loading, and higher frequency in case of heavier loading.

Furthermore, the controller 30 can cause hysteretic voltage for the first, second, third and fourth comparison values COMP_H, COMP_M, COMP_ML and COMP_L so as to perform an effect of hysteresis. As a result, the potential instability of the whole operation of power conversion caused by the switching signal PWM which changes between high and low levels can be avoided.

Figure 4:
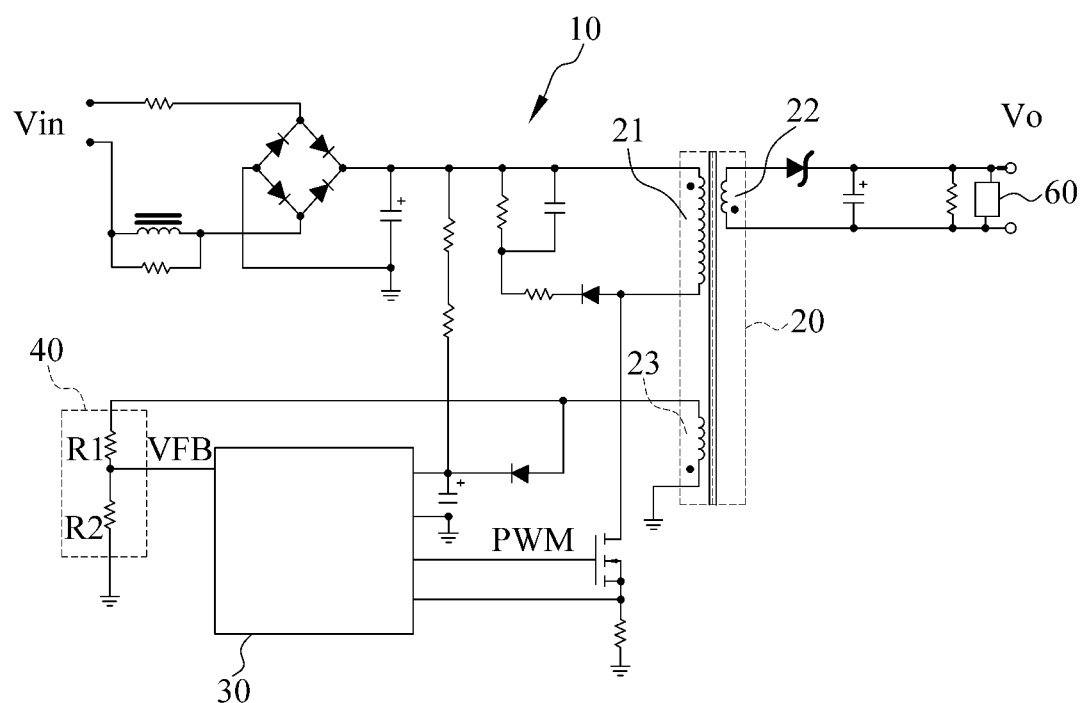
FIG. 4 is a view showing the power control device according to the present invention to generate the loading feedback signal by the first side feedback scheme.
Figure 5:
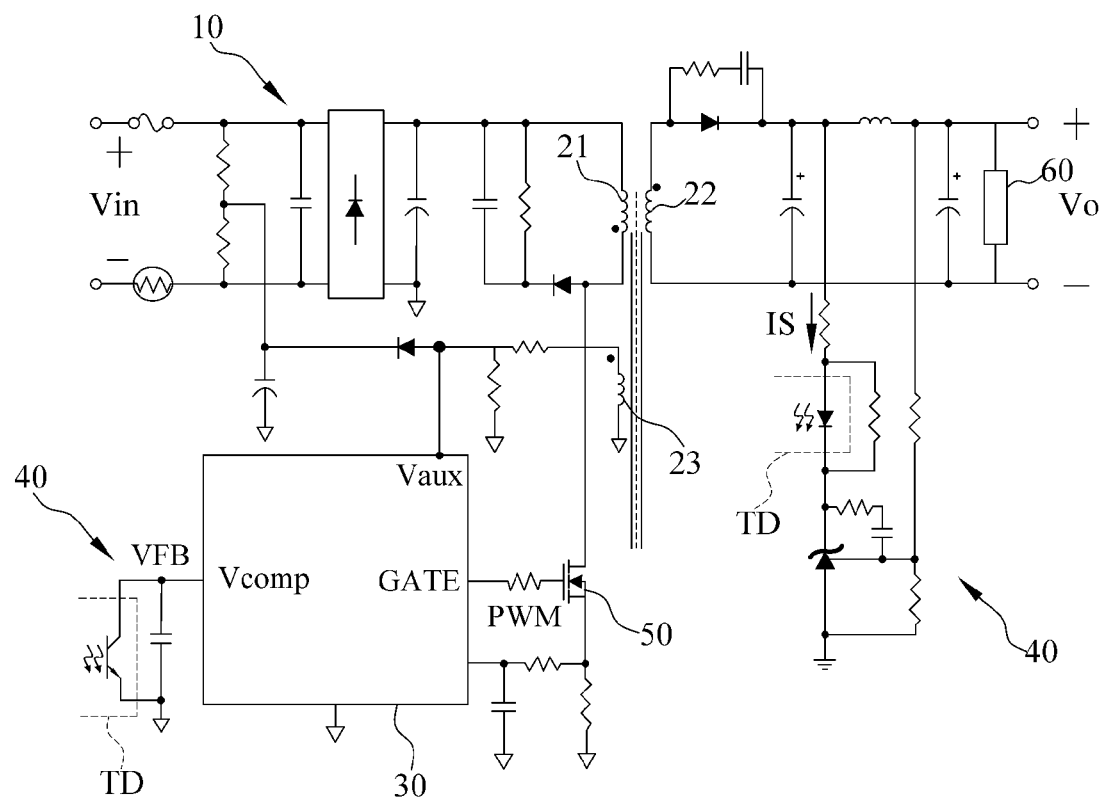
FIG. 5 is a view showing the power control device according to the present invention to generate the loading feedback signal by the second side feedback scheme.

Some illustrative examples of the loading feedback unit 40 generating the loading feedback signal VFB are shown in FIGS. 4 and 5, which indicate that the power control device for dynamically adjusting frequency according to the present invention is implemented by first side and second side feedback schemes, respectively.

As shown in FIG. 4, the loading feedback unit 40 comprises two serial resistors R1 and R2 as a voltage divider connected to the auxiliary induction coil 23. The loading feedback signal VFB is generated at the connection point of the two serial resistors R1 and R2. Alternatively, the loading feedback unit 40 in FIG. 5 primarily comprises a photo coupling device TD (or referred to photo isolator, photo coupler), which generates the loading feedback signal VFB by use of the photo coupling effect on the sensing current IS of the loading unit 12. The photo coupling device TD generally consists of a light emitting device and a light receiving device.

It should be noted that FIGS. 3 and 4 are only illustrative examples for clearly explaining the aspects of the present invention, and not intended to limit the scope of the present invention. In other words, the input power unit 10, the loading unit 12, the electric transformer 20, the controller 30, the loading feedback unit 40 and the switching transistor 50 of the present invention can be implemented by other equivalent electric elements or devices within the scope the present invention.

From the above description, one key feature of the present invention is that the frequency of the switching signal is dynamically adjusted based on the loading such that the frequency is lower when the loading is lighter, and the frequency is higher when the loading is heavier, thereby reducing the switching loss and improving the whole efficiency of power conversion.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A power control device for dynamically adjusting frequency, electrically connected to an input power unit and a loading unit to transform an input power into an output power supplying the loading unit, comprising:

an electric transformer comprising a first side induction coil connected to the input power unit, a second side induction coil connected to the loading unit for generating the output power by electromagnetic induction with the first side induction coil, and an auxiliary induction coil generating a power sensing signal by electromagnetic induction with the first side induction coil;

a loading feedback unit connected to the second side induction coil and the loading unit for generating a loading feedback signal corresponding to the output power;

a controller receiving the power sensing signal and the loading feedback signal to generate a switching signal based on a control criterion; and a switching transistor connected to the first side induction coil and receiving the switching signal to control one or both of a conducting current and a conducting voltage of the first side induction coil so as to control one or both of a current and a voltage of the second side induction coil, wherein the controller is implemented by a microcontroller unit (MCU) to generate the switching signal according to the loading feedback signal, and the MCU is programmed to accomplish the following:

controlling the switching signal to set the power control device in a continuous conduction mode (CCM) if a level of the loading feedback signal is greater than or equal to a first comparison value; and controlling the switching signal to set the power control device in a discontinuous conduction mode (DCM) and the frequency of the switching signal based on when the power sensing signal reaches a number of locally lowest levels if the level of the loading feedback signal is less than the first comparison value, wherein the number of locally lowest levels is at least one and changed according to the level of the loading feedback signal as follows:

the number of locally lowest levels being decreased by one until the number reaches zero if the level of the loading feedback signal is greater than a second comparison value;

the number of locally lowest levels being unchanged if the level of the loading feedback signal is less than the second comparison value but greater than a third comparison value;

the number of locally lowest levels being increased by one until the number reaches a preset maximum value if the level of the loading feedback signal is less than the third comparison value but greater than a fourth comparison value; and the number of locally lowest levels being set to the preset maximum value if the level of the loading feedback signal is less than the fourth comparison value;

wherein the first comparison value is greater than the second comparison value which is greater than the third comparison value which is greater than the fourth comparison value.

2. The power control device as claimed in claim 1, wherein the controller performs a function of setting a hysteresis effect on the first, second, third and fourth comparison values.

3. The power control device as claimed in claim 1, wherein the loading feedback unit is implemented by a feedback scheme of the first side induction coil and comprises a voltage divider consisting of two serial resistors connected to the auxiliary induction coil, and the loading feedback signal is generated at a connection point of the two serial resistors.

4. The power control device as claimed in claim 1, wherein the loading feedback unit is implemented by a feedback scheme of the second side induction coil and comprises a photo coupler for generating the loading feedback signal based on a sensing current corresponding to the loading unit by photo coupling effect, and the photo coupler comprises a light emitting device and a light receiving device.

* * * * *